(12) United States Patent
Deryck et al.

(10) Patent No.: US 8,785,712 B2
(45) Date of Patent: Jul. 22, 2014

(54) PHARMACEUTICAL DRUG DISPOSAL KIT

(75) Inventors: Brian Deryck, Canal Fulton, OH (US); John Heaton, Uniontown, OH (US)

(73) Assignee: RX Disposal Solutions, LLC, Uniontown, OH (US)

( * ) Notice: Subject to any disclaimer, the term of this patent is extended or adjusted under 35 U.S.C. 154(b) by 309 days.

(21) Appl. No.: 13/377,252

(22) PCT Filed: Jun. 10, 2010

(86) PCT No.: PCT/US2010/038085
§ 371 (c)(1),
(2), (4) Date: Dec. 9, 2011

(87) PCT Pub. No.: WO2010/144650
PCT Pub. Date: Dec. 16, 2010

(65) Prior Publication Data
US 2012/0088951 A1    Apr. 12, 2012

Related U.S. Application Data

(60) Provisional application No. 61/186,540, filed on Jun. 12, 2009.

(51) Int. Cl.
*A62D 3/36* (2007.01)
*B09B 3/00* (2006.01)

(52) U.S. Cl.
CPC ............. *B09B 3/0075* (2013.01); *B09B 3/0041* (2013.01); *B09B 3/0033* (2013.01)
USPC ......................................... 588/318; 588/315

(58) Field of Classification Search
CPC ......... A62D 3/33; A62D 3/36; A62D 101/20; B65D 81/32
See application file for complete search history.

(56) References Cited

U.S. PATENT DOCUMENTS

| 4,453,929 A | 6/1984 | Silverman et al. |
| 2001/0051379 A1 | 12/2001 | Pucher |
| 2004/0007147 A1 | 1/2004 | Jenkins et al. |
| 2004/0077513 A1 | 4/2004 | Leffenfeld et al. |
| 2006/0153955 A1 | 7/2006 | Hickey |
| 2008/0190381 A1 | 8/2008 | Stampe et al. |

OTHER PUBLICATIONS

"Household Disposal of Pharmaceuticals as a Pathway for Aquatic Contamination in the United Kingdom," Jonathan P. Bound; Nikolaos Voulvoulis; Environ Health Perspect. 2005;113(12):1705-1711. © 2005 National Institute of Environmental Health Sciences Posted Dec. 15, 2005. http://www.medscape.com/viewarticle/518748.
"Zebra Mussel Spawning Is Induced in Low Concentrations of Putative Serotonin Reuptake Inhibitors," P.P. Fong; The Biological Bulletin, vol. 194, Issue 2 143-149, Copyright © 1998 by Marine Biological Laboratory.
"Potential Impact of Pharmaceuticals on Environmental Health," Oliver A.H. Jones; Nick Voulvoulis; John N. Lester; Bulletin of the World Health Organization, Print ISSN 0042-9688; Bull World Health Organ vol. 81 No. 10 Genebra Oct. 2003, London, England.
"Outcomes of the California Ban on Pharmaceutical Lindane: Clinical and Ecologic Impacts," Elizabeth H. Humphreys; Sarah Janssen; Ann Heil; Patricia Hiatt; Gina Solomon; Mark D. Miller; Environ Health Perspect. 2008;116(3):297-302. © 2008 National Institute of Environmental Health Sciences.
"Should Patients Be Asked to Return Unused Opioids?" Response from Carolyn Buppert, CRNP, JD; Ask the Experts about Legal/Professional Issues for Advanced Practice Nurses from Medscape Nurses, posted Dec. 11, 2002. © 2002 by Medscape.
"The Environmental Side Effects of Medication," Alistair B.A. Boxall; EMBO Rep. Dec. 2004; 5(12): 1110-1116. doi: 10.1038/sj.embor.7400307. © 2004, European Molecular Biology Organization. PMCID: PMC1299201.

*Primary Examiner* — Edward Johnson
(74) *Attorney, Agent, or Firm* — Dureska, Kennedy, & Moore L.L.C.; Edward T. Kennedy

(57) ABSTRACT

A pharmaceutical drug disposal kit includes a container for receiving pharmaceutical drugs. Water is added to the container to create an aqueous solution with the pharmaceutical drugs, and a constituent in the container makes the solution a basic aqueous solution. A visual and/or taste deterrent is disposed in the container, and an adsorbent or absorbent is also disposed in the container to provide at least partial solidification of the solution. A binding agent is also disposed in the container to bind the ingredients of the pharmaceutical drug, the deterrent, and the adsorbent/absorbent, thereby changing the physical state of the pharmaceutical drugs into a substance that is undesirable to consume, and which enables safe disposal of the pharmaceutical drugs.

13 Claims, 3 Drawing Sheets

PHARMACEUTICAL DRUG DISPOSAL KIT

CROSS-REFERENCE TO RELATED APPLICATIONS

This application claims the benefit of PCT Application Serial No. PCT/US2010/038085, filed on Jun. 10, 2010, which claims the benefit of U.S. Provisional Patent Application Ser. No. 61/186,540, filed on Jun. 12, 2009.

BACKGROUND OF THE INVENTION

1. Technical Field

The present invention relates to the art of pharmaceutical drugs. More particularly, the present invention relates to the art of the disposal of pharmaceutical drugs. Still more particularly, the invention is directed to a kit that includes constituents or components that change the dynamics or medium of a pharmaceutical drug and which provides visual and taste deterrents for safe disposal of the drug.

2. Background Art

It is well known in the art that medicinal drugs are used routinely for the treatment of a variety of health problems or conditions experienced by patients. These medicinal drugs include drugs that, due to their nature, are restricted and must be prescribed to a patient by a licensed medical practitioner. When such drugs are prescribed, they are dispensed to a patient by a pharmacy and thus are known in the art as pharmaceutical drugs. It is to be understood that, for the purpose of convenience, reference herein to pharmaceutical drugs also includes drugs that are available without a prescription, known as over-the-counter drugs.

In most cases, pharmaceutical drugs are dispensed to a patient in pill, tablet, capsule, gel or liquid form. For the purpose of convenience, all of these forms shall collectively be referred to herein as pills. In some cases, the patient may not finish taking all of the pills that have been dispensed, and then needs to dispose of any remaining pills.

Traditionally, patients disposed of such pharmaceutical drugs by throwing the pills in the trash. However, it was discovered that throwing the pills in the trash without being mixed with deterrents enabled drug addicts or others to illicitly or accidentally obtain restricted drugs, and also led to the possibility that a child or pet might be able to find the pills and consume them out of curiosity. This has also let to the contribution of terra-pollution due to the lack of containment and the eventual washing of the pills into storm sewers and/or water recirculation and water treatment facilities.

Alternatively, patients were advised to flush pharmaceutical drugs down a toilet to dispose of them. It was then discovered that flushing pharmaceutical drugs down the toilet may create water toxicity problems, due to the presence of pharmaceuticals, which are not able to be removed by water treatment facilities.

To overcome the problems created by simply throwing pills in the trash or flushing them down the toilet, government agencies such as the U.S. Food and Drug Administration (FDA) have advised patients to mix the pills with used cat litter or used coffee grounds, and then dispose of them in the trash. By not flushing pills down a toilet, the pharmaceuticals and other ingredients do not enter the water supply. In addition, mixing of the pharmaceutical drugs with used cat litter or used coffee grounds provides a deterrent to drug addicts or others who may attempt to illicitly obtain the drugs from a patient's trash, or to children or pets who may attempt to consume pills out of curiosity.

The prior art solution of mixing pharmaceutical drugs with used cat litter or used coffee grounds to dispose of them still possesses disadvantages. For example, not all patients have used cat litter or used coffee grounds available to them when they need to dispose of pharmaceutical drugs. In addition, mixing pills with used cat litter or used coffee grounds, while providing a deterrent, does not change the dynamic of the pharmaceutical drug, so that illicit attempts to obtain the drug from the mixture are still sometimes made.

As a result, there is a need in the art for an apparatus or kit that includes constituents or components that change the dynamic of a pharmaceutical drug or creates an irreversible medium for a pharmaceutical drug, and which provides visual and taste deterrents, to enable safe disposal of the drug by a user of the kit.

BRIEF SUMMARY OF THE INVENTION

An objective of the present invention is to provide an apparatus that includes constituents or components that change the dynamic of a pharmaceutical drug to enable safe disposal of the drug.

Another objective of the present invention is to provide an apparatus that includes constituents or components that create an irreversible medium for a pharmaceutical drug to enable safe disposal of the drug.

Yet another objective of the present invention is to provide an apparatus that provides visual and/or taste deterrents to enable safe disposal of a pharmaceutical drug.

These objectives and others are obtained by the pharmaceutical drug disposal kit of the present invention. In an exemplary embodiment of the invention, the kit includes a container for receiving pharmaceutical drugs and water, in which the pharmaceutical drugs and water create an aqueous solution in the container. A constituent is disposed in the container for making the solution a basic aqueous solution. At least one deterrent constituent is also disposed in the container. At least one of an adsorbent and an absorbent constituent is also disposed in the container to provide at least partial solidification of the solution. At least one binding agent constituent is disposed in the container to bind ingredients of the pharmaceutical drug, the at least one deterrent constituent, and the at least one of an adsorbent and absorbent constituent, in which the physical state of the pharmaceutical drugs is changed in order to enable safe disposal of the drugs.

These objectives and others are obtained by the method of disposing of pharmaceutical drugs of the present invention. In an exemplary embodiment of the invention, the method includes providing a container and introducing pharmaceutical drugs into the container. Water is introduced into the container to create an aqueous solution with the pharmaceutical drugs. A constituent for making the aqueous solution a basic solution is provided, and at least one deterrent constituent is provided in the container. The aqueous solution is at least partially solidified said with at least one of an adsorbent and an absorbent constituent disposed in the container. Ingredients of the pharmaceutical drugs, the at least one deterrent constituent, and the at least one of an adsorbent and absorbent constituent are bound using at least one binding agent constituent disposed in the container, and the container is disposed of.

BRIEF DESCRIPTION OF THE SEVERAL VIEWS OF THE DRAWINGS

The preferred embodiments of the present invention, illustrative of the best modes in which Applicants have contemplated applying the principles, are set forth in the following description and are shown in the drawings, and is particularly and distinctly pointed out and set forth in the appended claims.

Similar numerals refer to similar parts throughout the drawings.

DETAILED DESCRIPTION OF THE INVENTION

The pharmaceutical drug disposal kit of the present invention, which is shown in FIGS. 1-5 and indicated generally at 40, changes the dynamics of the pharmaceutical drug. More particularly, the constituents of the kit break the pharmaceutical drug(s) down, liquefy it if able, mix it with deterrents, and then re-solidify it so that it is essentially unrecognizable from the original pharmaceutical drug(s).

Figure 1:
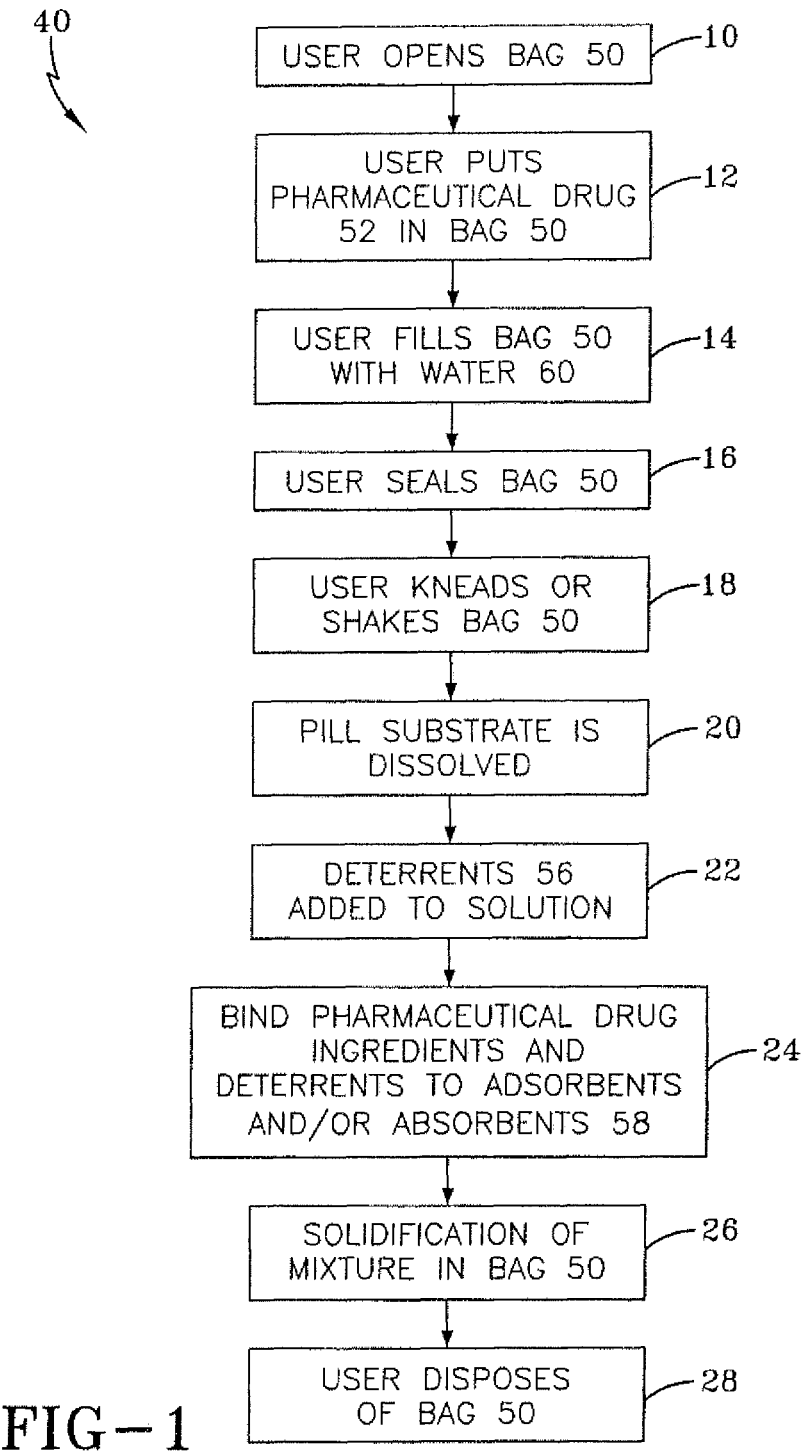
FIG. 1 is a flow chart showing exemplary steps associated with the use of the pharmaceutical drug disposal kit of the present invention.
Figure 2:
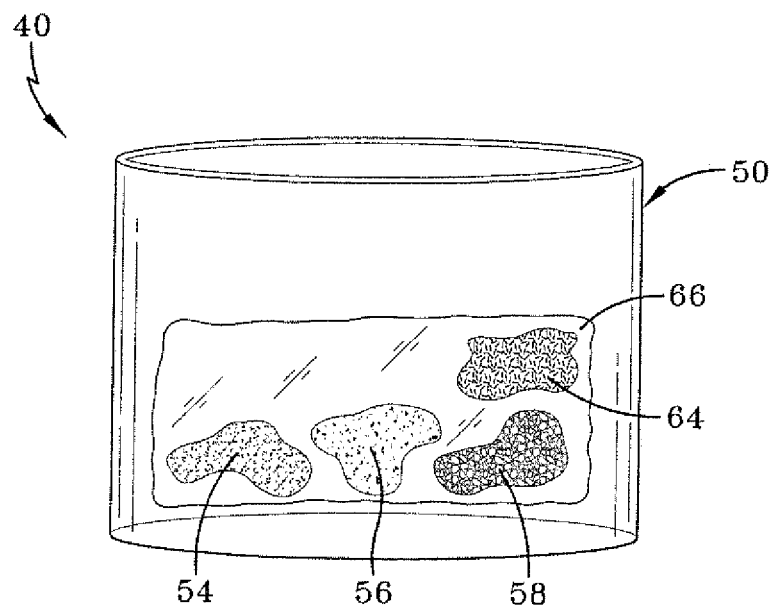
FIG. 2 is a schematic representation of certain exemplary constituents of the pharmaceutical drug disposal kit of the present invention.

As shown in FIG. 2, the first element of kit 40 is a main or first container 50, such as a flexible bag or pouch. Preferably, a puncture-resistant sealable bag, which maintains a closed, sealed environment, is employed for container 50. For example, a puncture-resistant Ziploc®-type of bag may be used for container 50. Flexible bag 50 enables a user to physically knead or mix the components, as will be described below. In addition, flexible bag 50 enables convenient shipping and display of pharmaceutical drug disposal kit 40. Alternatively, a more rigid container (not shown) that is sealable may be employed. For the purpose of convenience, reference herein will be made to bag 50, with the understanding that such reference includes bags, pouches, rigid containers and other containers suitable for use in the pharmaceutical drug disposal kit of the present invention.

Figure 3:
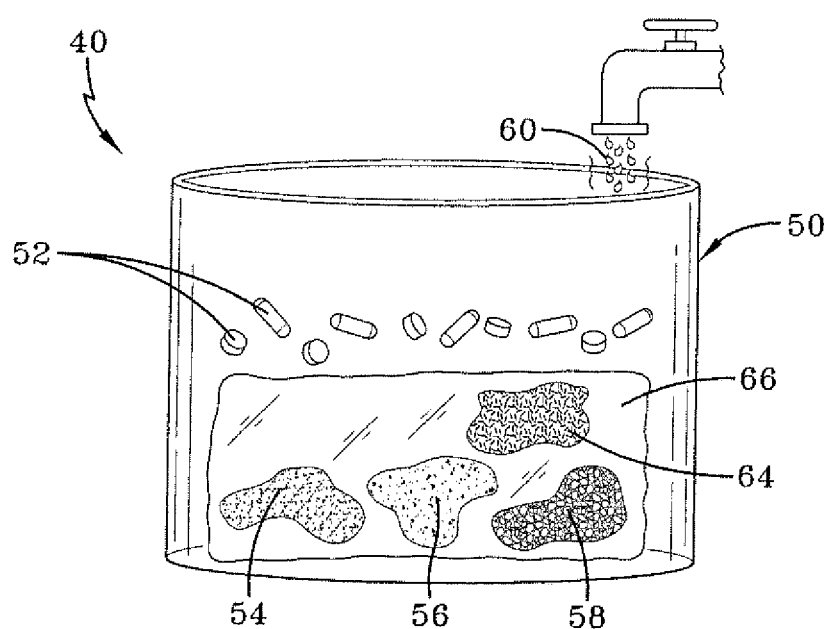
FIG. 3 is a schematic representation of the pharmaceutical drug disposal kit shown in FIG. 2 with water being added.
Figure 4:
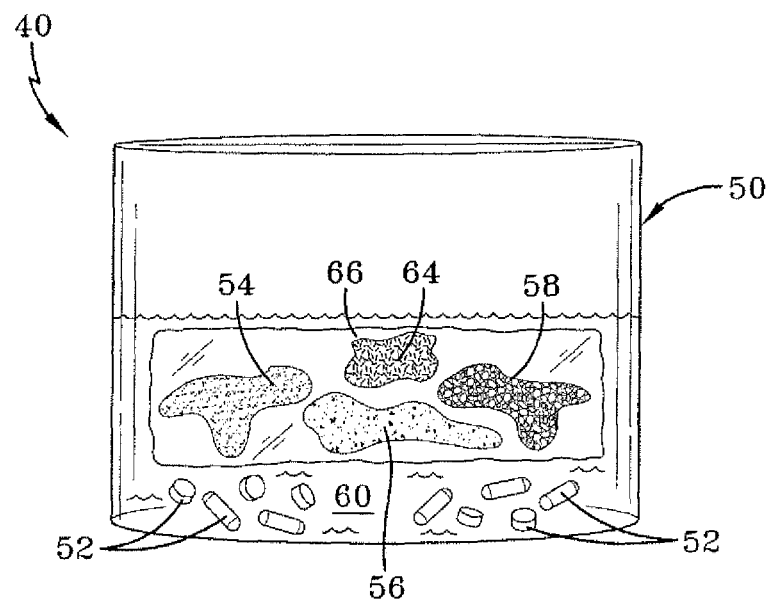
FIG. 4 is a schematic representation of the pharmaceutical drug disposal kit shown in FIG. 2, after water has been added.

Bag 50 contains additional elements of kit 40, which are constituent ingredients or substances, as will be described in detail below. With additional reference now to the flow chart of FIG. 1, a user opens bag 50, step 10, and puts the pharmaceutical drug in the bag, step 12. By way of example, reference shall be made to the pharmaceutical drug in pill form 52 (FIG. 3), with the understanding that such reference includes pill, tablet, capsule, gel and/or liquid form. Once the user places pills 52 into the bag, step 12, the user introduces a sufficient amount of water 60 into bag 50, step 14. As shown in FIG. 3, water 60 preferably is ordinary tap water, and more preferably, is hot tap water. Once a sufficient amount of water 60 is in bag 50, the user seals the bag in step 16, as shown in FIG. 4. Activation of the constituents is provided by the user shaking or kneading bag 50, step 18, as will be described in greater detail below. Such activation preferably includes three phases.

In a first phase, hot tap water 60 dissolves the substrate of each pill 52 in an aqueous solution, step 20. Preferably, the aqueous solution is a base or basic solution, and does not exceed a hydrogen-ion concentration (pH) of about nine (9). To maintain a base or basic solution with a pH of about nine (9) or less, a constituent such as sodium bicarbonate 54 is disposed or contained in bag 50. Sodium bicarbonate 54 also enables the breakdown of enteric-coated pills 52 by hot tap water 60. Other substances may be substituted for sodium bicarbonate 54, and include substances that produce a base or basic pH level. For example, bleach, ammonia, and/or potassium hydroxide, including lye, potash, and the like may be used.

In a second phase, deterrents 56 that are included in main bag 50 are added to the solution, such as visual and taste deterrents, step 22. For example, activated charcoal powder 56 may be used, which turns the product black to serve as a visual deterrent, and includes a bad taste that serves as a taste deterrent. Another deterrent 56 includes activated charcoal granules, which produce black pseudo-sharp specks to serve as a visual deterrent, and includes a gritty texture and bad taste that serve as a taste deterrent. Other visual deterrents 56 may be used, and provide an undesirable appearance to the solution. For example, coloring agents or dyes, and/or ground minerals such as mica, talc, diatomaceous earth (DE), silica and/or calcium carbonate may be used as visual deterrents 56.

Another taste deterrent 56 includes denatonium powder, such as denatonium benzoate, which is known in the art by the trade name Bitrex. Bitrex is water soluble and makes the solution extremely bitter. Other taste deterrents 56 may be used, including substances such as sucrose octaacetate, jalapeno concentrate, habanera concentrate, other pepper concentrates, syrup of ipecac, silica, any type of natural sand, or clay or other substances that create an undesirable or unpleasant taste.

It is to be understood that one or more deterrents 56, as well as combinations of deterrents, may be used in pharmaceutical drug disposal kit 40 of the present invention. Moreover, types of deterrents 56 other than visual or taste deterrents may be employed, which may be selected based on particular considerations for drug disposal kit 40. For example, an olfactory deterrent may also be included.

In a third phase, the ingredients of pharmaceutical drug 52 and deterrents 56 are bound to a suitable or sufficient amount of adsorbents and/or absorbents 58, step 24, which enables the mixture to solidify for disposal, step 26. Therefore, adsorbents and/or absorbents 58 are included in bag 50 to help solidify the solution or suspension. For example, the activated charcoal powder described above also acts as an adsorbent. In addition, substances such as sodium silicate, calcium oxide, anhydrous clay, calcium carbonate, concrete, crushed limestone, epoxy, and/or cellulose may be used as adsorbents/absorbents 58.

Figure 5:
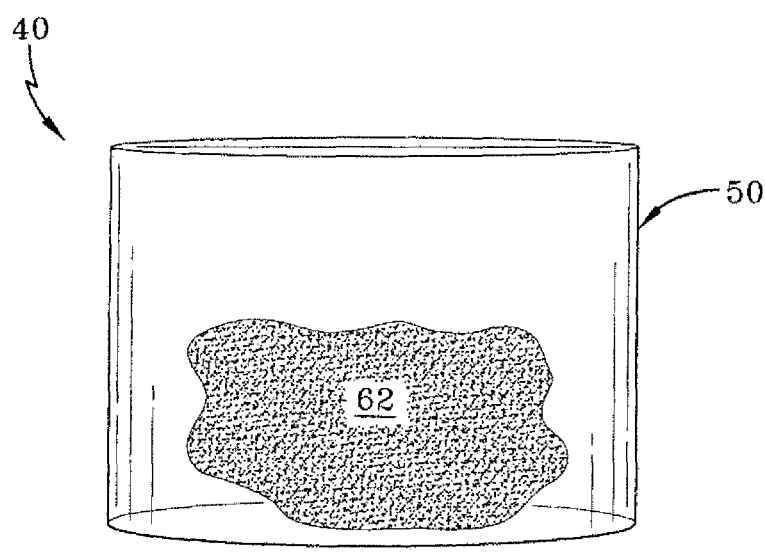
FIG. 5 is a schematic representation of the pharmaceutical drug disposal kit shown in FIG. 2, after solidification of certain constituents.

In the third phase, a binding agent 64 that is also included in bag 50 binds together the ingredients of pharmaceutical drug 52, deterrents 56 and adsorbents/absorbents 58. For example, while the activated charcoal described above acts as a deterrent 56 and an adsorbent 58, and may also provide a modest amount of binding, additional binders 64 preferably are included. The same is true for sodium silicate, which acts as an adsorbent 58, and may also provide a modest amount of binding. A preferable additional binder 64 includes alginate, which in step 26 preferably irreversibly solidifies the liquefied pharmaceutical drugs and the deterrents in a solid or semi-solid mass 62, as shown in FIG. 5. Other binders or binding agents 64 that may be employed include gelatin, epoxy resins, concrete, cellulose, anhydrous clay, latex, and/or any acrylic acid, such as polyacrylic acid (including sodium polyacrylic polymer and cross-linked sodium polyacrylic acid), meth acrylic acid, and the like.

Preferably, a bag 66, which shall be referred to herein as a second bag or a PVOH bag, is disposed in main or first bag 50 to conveniently hold or contain one or more of sodium bicarbonate 54, deterrents 56, adsorbents/absorbents 58, and binding agent 64. Second bag 66 preferably is water soluble, being made from a material such as polyvinyl alcohol (PVOH), and is large enough to hold sodium bicarbonate 54, deterrents 56, adsorbents/absorbents 58, and binding agent 64, while being small enough to fit inside main bag 50 with pharmaceutical drugs 52 and water 60. For example, second bag 66 preferably is about three (3) inches wide by about four (4) inches tall by about 0.003 inches in thickness.

In this manner, second bag 66 may provide packaging convenience for kit 40, while also acting as a time delay device for releasing certain constituents, such as binding agent 64, into main bag 50 and thus water 60. The time release is accomplished by the time required to dissolve second bag 66 with hot tap water 60. For example, second bag 66 may dissolve about forty-five (45) seconds after water 60 has been introduced into main bag 50. As second bag 66 dissolves, sodium bicarbonate 54 creates a basic solution and enables the breakdown of enteric-coated pills 52 by water 60, deterrents 56 are added to the solution, and the ingredients of the pharmaceutical drug and the deterrents are bound to adsorbents and/or absorbents 58.

To activate or encourage the progression of all three phases, as described above, the user of kit 40 can knead or shake flexible bag 50 until solid or semi-solid mass 62 is created, step 26. In the event that a more rigid container 50 is used, the user may alternatively shake the container until solid or semi-solid mass 62 is created. In this manner, the physical state of the pharmaceutical drug composition is changed into a solid or semi-solid substance 62 that is undesirable to consume and is reasonably resistant to illicit distillation or reverse engineering. The user can then dispose of bag 50 in the trash, step 28.

It is to be understood that the amount of each particular constituent is determined according to the size of bag or container 50 used with kit 40, and to the maximum amount of pharmaceutical drugs 52 that are intended for disposal with a specific kit.

For example, in a particularly preferred embodiment of pharmaceutical drug disposal kit 40 of the invention, a 150 milliliter flexible, puncture-resistant Ziploc®-type main or first bag 50 is used. Bag 50 preferably contains about fifty (50) milligrams of sodium bicarbonate 54, which is about 0.28 percent by weight of the exemplary constituents in the bag, that is, constituents other than any pharmaceutical drugs 52 and tap water 60 that will be added to the bag. Sodium bicarbonate 54 enables the breakdown of enteric coated pills 52 by hot tap water 60, and maintains the resulting solution at a pH of about nine (9) or less. Bag 50 also contains about one (1) gram of activated charcoal powder, which is about 5.54 percent by weight of the exemplary constituents in the bag. The activated charcoal turns the product black to serve as a visual deterrent 56, includes a bad taste that serves as a taste deterrent, acts as an adsorbent 58, and also provides a modest amount of binding. Also included in the bag are about nine (9) milligrams of denatonium benzoate/Bitrex, which is about 0.05 percent by weight of the exemplary constituents in the bag, to provide an extremely bitter substance that serves as a taste deterrent 56.

Further included in bag 50 is about one (1) gram of play sand (natural silica), which is about 5.54 percent by weight of the exemplary constituents in the bag, and which serves as an adsorbent 58 and a taste deterrent 56. About one (1) gram of coarse silica gel is also included in bag 50, which is about 5.54 percent by weight of the exemplary constituents in the bag, and serves as an additional adsorbent 58. Also included is about 15 grams of 880 Alginate, which is about 83.06 percent by weight of the exemplary constituents in bag 50, and which acts as a binding agent 64 to solidify the liquefied pharmaceutical drugs and the deterrents in a solid or semi-solid mass 62.

Further included in main or first bag 50 is second bag 66, which preferably is about three (3) inches wide by about four (4) inches tall by about 0.003 inches in thickness, is made from polyvinyl alcohol (PVOH), and contains the above-described full quantity of 880 alginate powder, sodium bicarbonate, activated charcoal powder, Bitrex, natural silica, and silica gel. This second bag 66 is water soluble and acts as a time delay device for releasing the constituents, and in particular binding agent/alginate 64 into main bag 50. The time release is accomplished by the time required to dissolve PVOH bag 66 with hot tap water 60. Alternatively, selected ones or combinations or constituents may be included in second bag 66, such as only binding agent/alginate 64, enabling subsequent release of the alginate into the mixture of other constituents and pharmaceuticals upon the dissolving of PVOH bag 66.

With these constituents in main bag 50, the user places the pharmaceutical drugs 52 that are to be disposed in the bag, step 12, being careful not to exceed about one-fourth of the bag volume with pharmaceuticals, and fills the bag about half way with hot tap water 60, step 14. The user then seals bag 50, step 16, and then shakes and/or kneads it, step 18. Hot tap water 60 dissolves PVOH bag 66, enabling release of the constituents. Hot water 60, aided by sodium bicarbonate 54, breaks the pills down, step 20, and in most cases, creates an aqueous solution. The activated charcoal powder, play sand and Bitrex combine in the solution to provide respective visual and taste deterrents 56, step 22. The charcoal powder and silica gel act as adsorbents 58 to assist in adsorbing the pills, step 24, and alginate 64 binds and solidifies the mixture, step 26, resulting in a solid or semi-solid mass 62.

The pharmaceutical drug is thus rendered unappealing by pharmaceutical drug disposal kit 40 of the present invention, and is unrecognizable from the original pharmaceutical drug so as to deter consumption. The resulting solid or semi-solid mass 62 in sealed bag 50 can then be disposed of in the trash, step 28. Because mass 62 is in a sealed bag 50, safe disposal and transport, and leaching of the pharmaceuticals and other ingredients of the pharmaceutical drug are prevented.

In this manner, pharmaceutical drug disposal kit 40 of the present invention overcomes the problems of the prior art. Because drugs 52 are not flushed, no pharmaceuticals or other ingredients are introduced to the water system. Also, because drugs 52 are in a solid or semi-solid mass 62 that is sealed in bag 50, there is no leaching of such drugs into the water system.

Essentially, pharmaceutical drug disposal kit 40 of the present invention changes the dynamic of pharmaceutical drugs 52, so that they are unrecognizable and thus safe to dispose of in the trash. In addition, pharmaceutical drug disposal kit 40 of the present invention provides visual and taste deterrents 56, further contributing to safe disposal in the trash. Solid or semi-solid mass 62 in sealed bag 50 minimizes the ability of a drug addict or other person to attempt to illicitly obtain the pharmaceutical drug, and also minimizes the ability of a child or pet to consume the drug out of curiosity.

Pharmaceutical drug disposal kit 40 of the present invention is easy for a user to employ. More particularly, the powder or granular nature of the constituents in kit 40 enables them to be placed in the bag in advance. Bag 50 with the constituents can then be sold in retail establishments, since the constituents are not controlled substances. Kit 40 may be readily available to users, since it can be purchased in advance and stored in the home of the user, and then used when it is convenient for the user. Such availability and convenience desirably increases the likelihood of proper disposal of pharmaceutical drugs 52.

The present invention also includes a method of disposing of pharmaceutical drugs using kit 40, with steps in accordance to the description provided above and shown in FIGS. 1-5.

It is to be understood that certain constituents or components of the present invention may be substituted, or quantities, volumes or amounts may be adapted or changed, without affecting the overall concept or operation of the invention. In addition, while the invention has been described above with reference to pills, it is to be understood that it applies to prescription and over-the-counter pharmaceutical drugs or preparations in any form, for example, pills, tablets, capsules, gels, or liquids. The present invention may also be used to capture and discard the urine of patients who consume pharmaceutical drugs, including antibiotics, hormones or chemotherapy drugs, thereby preventing heavy metals or other ingredients in the drugs that pass through the patients' urine from being introduced into the water supply.

Moreover, while reference has been made above to use of the invention by patients to whom pharmaceutical drugs have been dispensed, it may be used by others, such as government authorities, law enforcement authorities, companies, an the like to dispose of drugs, without affecting the overall concept or operation of the invention. Of course, the amount of constituents or components described above would be adjusted accordingly for such other uses, and the container or containment mechanism may be adapted for a higher volume of materials.

Accordingly, the pharmaceutical drug disposal kit is simplified, provides an effective, safe, inexpensive, and efficient structure which achieves all the enumerated objectives, provides for eliminating difficulties encountered with prior art disposal systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the pharmaceutical drug disposal kit is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A pharmaceutical drug disposal kit, said kit including:
   a container for receiving pharmaceutical drugs and water, said pharmaceutical drugs and water creating an aqueous solution in said container;
   a constituent disposed in said container for making said solution a basic aqueous solution, wherein said constituent for producing a basic aqueous solution is selected from the group consisting of sodium bicarbonate, bleach, ammonia, potassium hydroxide, lye, and potash;
   at least one deterrent constituent disposed in said container;
   at least one of an adsorbent and an absorbent constituent disposed in said container to provide at least partial solidification of said solution; and
   at least one binding agent constituent disposed in said container to bind ingredients of said pharmaceutical drug, said at least one deterrent constituent, and said at least one of an adsorbent and absorbent constituent, whereby the physical state of said pharmaceutical drugs is changed in order to enable safe disposal of the pharmaceutical drugs.

2. The pharmaceutical drug disposal kit of claim 1, wherein said container is a flexible bag.

3. The pharmaceutical drug disposal kit of claim 1, wherein said aqueous solution includes a hydrogen-ion concentration that does not exceed a value of about nine.

4. The pharmaceutical drug disposal kit of claim 1, wherein said at least one deterrent constituent includes a visual deterrent.

5. The pharmaceutical drug disposal kit of claim 4, wherein said visual deterrent is selected from the group consisting of activated charcoal powder, activated charcoal granules, coloring agents, dyes, ground minerals, mica, talc, diatomaceous earth, silica, and calcium carbonate.

6. The pharmaceutical drug disposal kit of claim 1, wherein said at least one deterrent constituent includes a taste deterrent.

7. The pharmaceutical drug disposal kit of claim 6, wherein said taste deterrent is selected from the group consisting of activated charcoal powder, activated charcoal granules, denatonium powder, denatonium benzoate, sucrose octaacetate, jalapeno concentrate, habanera concentrate, other pepper concentrates, syrup of ipecac, silica, natural sand, and clay.

8. The pharmaceutical drug disposal kit of claim 1, wherein said at least one deterrent constituent includes an olfactory deterrent.

9. The pharmaceutical drug disposal kit of claim 1, wherein said at least one of an adsorbent and an absorbent constituent is selected from the group consisting of activated charcoal powder, sodium silicate, calcium oxide, anhydrous clay, calcium carbonate, concrete, crushed limestone, epoxy, natural sand, silica gel, and cellulose.

10. The pharmaceutical drug disposal kit of claim 1, wherein said at least one binding agent constituent is selected from the group consisting of activated charcoal powder, activated charcoal granules, sodium silicate, alginate, gelatin, epoxy resins, concrete, cellulose, anhydrous clay, latex, acrylic acid, polyacrylic acid, sodium polyacrylic polymer, cross-linked sodium polyacrylic acid, and meth acrylic acid.

11. The pharmaceutical drug disposal kit of claim 1, further comprising a second container disposed in said container for receiving pharmaceutical drugs and water, said second container containing at least one of said constituent for making a basic aqueous solution, said at least one deterrent constituent, said at least one of an adsorbent and an absorbent constituent, and said at least one binding agent constituent.

12. The pharmaceutical drug disposal kit of claim 11, wherein said second container is water soluble.

13. The pharmaceutical drug disposal kit of claim 12, wherein said second container is made of polyvinyl alcohol.

* * * * *